United States Patent Office 3,598,805
Patented Aug. 10, 1971

3,598,805
ERYTHROMYCIN ESTER DERIVATIVES
Peter Hadley Jones, Lake Forest, Ill., assignor to Abbott Laboratories, North Chicago, Ill.
No Drawing. Continuation-in-part of application Ser. No. 807,444, Mar. 14, 1969, which is a continuation-in-part of application Ser. No. 654,046, July 18, 1967. This application Feb. 26, 1970, Ser. No. 14,681
Int. Cl. C07c 129/18
U.S. Cl. 260—210
6 Claims

ABSTRACT OF THE DISCLOSURE

The 4'-hydroxyerythromycin A and B derivatives together with its acid-addition salts have been found to have antibiotic activity. The compound has been made by oxidation of erythromycin A or B to the N oxide, followed by pyrolysis to 3-(dedimethylamino)-$\Delta^{3',4'}$-erythromycin. The unsaturate is then epoxidized and 3'-(dedimethylamino) - 3'-azido-4'-hydroxyerythromycin formed by opening the epoxy ring with an azide. The azide is then reduced to 3'-(dedimethylamino)-3'-amino-4'-hydroxyerythromycin, which is further reduced in the presence of formaldehyde to 4'-hydroxyerythromycin.

DESCRIPTION OF THE INVENTION

This is a continuation-in-part of Ser. No. 807,444 filed Mar. 14, 1969, and now abandoned which was a continuation-in-part of Ser. No. 654,046 filed July 18, 1967 and has been abandoned and relates to novel derivatives of erythmromycin A and B and to a process for their preparation. More particularly, this invention is directed to 3',4'-desosamine derivatives of the antibiotic erythromycin A and B. The term "erythromycin," used herein without modification, embraces both erythromycin A and erythromycin B.

Erythromycin is a well-known antibiotic having a broad spectrum of antibacterial activity, effective against those strains of bacteria most commonly encountered in infections afflicting warm-blooded animals. The complete structure of erythromycin is set forth in J.A.C.S., 79 6062 (1957). For the present purpose it will be at times found convenient to abbreviate the formula from the structural formula found there to the following

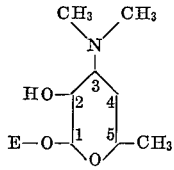

where E represents both the erythronolide and the cladinose moiety, the desosamine moiety being shown in its entirety. In all the structural formulae wherein E appears, it will be ascribed this same meaning.

The derivatives with which this invention is concerned has substitutions at the 4'- or both the 3'- and 4'-positions. These compounds have the following structural formula

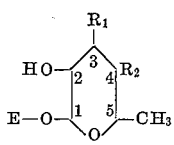

wherein $R_1$ represents a radical selected from the group consisting of dimethylamino, amino, azido, $R_2$ is hydroxy;

The 4'-hydroxyerythromycin and the 3'-de(dimethylamino) - 3' - amino-4'-hydroxyerythromycin have antibiotic activity. The other compounds of this invention, including 3' - de(dimethylamino) - 3'-amino-4'-hydroxyerythromycin, are useful as precursors in the preparation of 4'-hydroxyerythromycin.

As the following experimental results set forth in Tables I to III illustrate, 4'-hydroxyerythromycin A has a spectrum of activity similar to erythromycin A. In Table I, there is shown the activity of 4'-hydroxyerythromycin A against a number of bacterial strains and certain other microorganisms.

Pharmaceutically acceptable non-toxic salts include single entities and mixtures of these acid addition salts which include the hydrochloride, the hydrobromide, the hydroiodide, lactobionate, thiocyanate, both lower alkyl sulfates and the higher alkyl sulfates such as stearyl sulfate, lauryl sulfate and cetyl sulfate, alkyl and aryl sulfonates, phosphates, sulfates, maleates, fumarates, succinates, tartrates, citrates, stearates and others commonly used in the art.

Salts obtained through variation of the acid used to neutralize the base compound and form the acid addition salt have special advantages in some instances because of their increased stability, increased solubility, decreased solubility, ease of crystallization, or lack of objectionable taste. Such advantages accrue to the ease of administration and assimilation of the compound and properties which are subsidiary to the main physiological action of the individual cation and is independent of the character of the anion of the acid used in the preparation of the salt. The process of obtaining the salt is a straight forward neutralization reaction and it can be carried out in any suitable solvent through the addition of a chemical equivalent of acid to each chemical equivalent of the base.

TABLE I.—BACTERIA

| Organism: | Minimum inhibitory concentration (MIC), mcg./ml., 24 hours |
|---|---|
| Staph. aureus 209P | 0.2 |
| Staph. aureus 209 PER | 6.2 (>100–48 hrs.) |
| Staph. aureus (Smith) | 0.39' |
| Staph. aureus (Smith) ER | >100 |
| Staph. aureus 45 | 0.39 |
| Staph. aureus 45 ER | >100 |
| Staph. aureus 67 | 0.39 |
| Staph. aureus 67 ER | >100 |
| Staph. aureus (Quinones) | >100 |
| Staph, aureus (Wise) 155 | >100 |
| Staph. aureus (Web) | 0.39 |
| Staph. epidermidis 3519 | 0.39 |
| Staph. epidermidis 3519 ER | >100 |
| Strep. pyogenes C203 | 0.05 |
| Strep. faecalis 10541 | 0.2 |
| Diplococcus pneumoniae Type I | 0.05 |
| Haemophilus influenzae 9334 | 6.2 |
| E. coli (Juhl) | 100 |
| A. aerogenes 13048 | >100 |
| Kleb. pneumoniae 10031 | 12.5 |
| Sal. typhimurium Ed. #9 | 50 |
| Sal. typhosa 992 | 100 |
| Shig. sonnei 9290 | 25 |
| Prot. vulgaris JJ | >100 |
| Prot. mirabilis #9 | >100 |
| Pseudo. aeruginosa 9027 | >100 |
| Mycoplasma gallisepticum | [1] 0.2 |
| Mycoplasma granularum | [1] 0.1 |
| Mycoplasma hyorhinis | [1] 50 |
| Mycoplasma pneumoniae | [1] 0.2 |

TABLE I—Continued

| Organism: | Minimum inhibitory concentration (MIC) mcg./ml., 24 hrs. |
|---|---|
| *Panagrellus redivivus*: | |
| Cidal test | >100 |
| Static test | >100 |
| *Schisto. mansoni* | 100 |
| *Trich. vaginalis* | >100 |
| *Crithidia fasciculata* | >100 |
| *T. cruzi* | >10 |

[1] Indicates 7-day incubation.

The bactericidal activity of 4'-hydroxyerythromycin A against a single strain of *Staph. aureus* and *Strep. pyogenes* is shown in Table II. The method was a standard tube dilution test with plate counts of tubes showing no growth after both 24 and 48 hour incubation. The minimum bactericidal concentration (MBC) is defined at the concentration that gives a 99.9 percent reduction of viable cells as indicated by plate counts.

TABLE II

| Organism and incubation time | 4'-hydroxyerythromycin A | |
|---|---|---|
| | MIC, mcg./ml. | MBC, mcg./ml. |
| *Staph. aureus* Smith: | | |
| 24 hours | 0.39 | 6.2 |
| 48 hours | 0.39 | 0.78 |
| *Strep. pyogenes* C203: | | |
| 24 hours | 0.05 | 0.2 |
| 48 hours | 0.05 | 0.1 |

Table III illustrates results obtained when two preparations of 4'-hydroxyerythromycin A were tested against the acute *Staph. aureus* (Smith) infection of mice. Treatment was given by both the oral and intramuscular routes. Ten mice were used for each group, and the antibiotics were administered 1, 3, 5 and 7 hours post infection. Erythromycin lactobionate was used for comparison. The 4'-hydroxyerythromycin A preparations were used on a dry weight basis. Erythromycin A was used on activity basis calculated to the erythromycin base equivalent.

TABLE III

Comparative Activity of 4'-Hydroxyerythromycin A by Mouse Protection Tests with *Staph. aureus* (Smith)

| Preparation | Route of medication | Approximate $CD_{50}$, mg./kg. total dose |
|---|---|---|
| 4'-hydroxyerythromycin A (trial 1) [1] | Intramuscular | 20 |
| Do.[1] | Oral | 100–200 |
| 4'-hydroxyerythromycin A (trial 2) [1] | Intramuscular | 10–20 |
| Do.[1] | Oral | 150 |
| Erythromycin lactobionate | Intramuscular | 25–50 |
| Do | Oral | 50 |

[1] The difference between trial 1 and 2 was that the test compound in trial 2 was of higher purity.

The 4-hydroxyerythromycin is conveniently prepared according to the following reaction scheme:

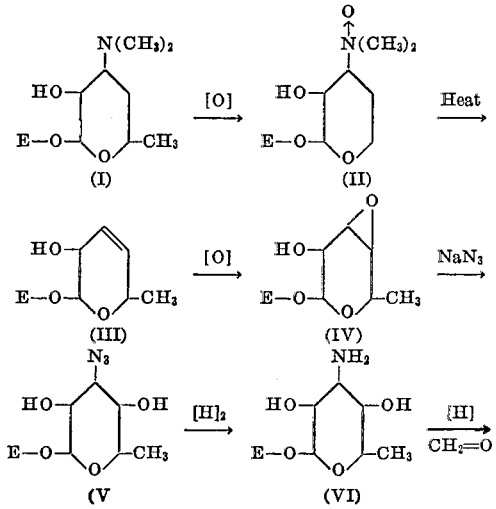

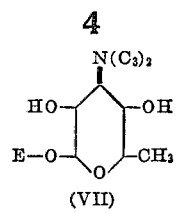

According to this scheme, erythromycin (I) is treated with a suitable oxidant such as a peroxide, hydrogen peroxide being preferred. Oxidation results in the formation of the amine oxide derivative (II) which when heated to a temperature sufficient to react without destruction of the heat-sensitive erythromycin, reacts to form the unsaturated 3',4' derivative (III). A temperature of about 150°–170° C. has been found the desirable range to obtain a good yield.

The pyrolysis product is then treated with an epoxidizing agent such as the organic peracids. Especially preferred is m-chloroperbenzoic acid because of its less hazardous qualities. Then the epoxidized derivative (IV) is reacted with an alkali azide such as sodium azide to form 3'-(dedimethylamino) - 3 - azido-4-hydroxyerythromycin (V). When this azide is reduced to the amine (VI), it is reduced to the 3'-(dedimethyl)-3'-amino-4'-hydroxyerythromycin which with formaldehyde under reducing conditions forms 4'-hydroxyerythromycin (VII).

A more specific explanation of these preparative procedures will now be set forth to make clear the details of this invention, but are included only as examples and ought not be construed as limitations on this invention.

Preparation of 3'-(dedimethylamino)-3',4'-epoxyerythromycin A

The 3'-dedimethylamino-$\Delta^{3',4'}$-erythromycin A was prepared by pyrolyzing 54.5 grams of the erythromycin A-N-oxide (as described by Flynn in J.A.C.S. 76,, 3126 (1954) at 165°–170° C. and a vacuum of 0.2 millimeters of mercury for four hours. The pyrolysis products were then dissolved in methanol, treated with charcoal, filtered and recrystallized from a chloroform-ether mixture. The 3'-dedimethylamino-$\Delta^{3',4'}$ was obtained in a yield of 24.4 grams having a melting point of 218°–219° C. This preparation is described in complete detail in the co-pending U.S. patent application, Ser. No. 542,219, filed Apr. 13, 1966.

Fourteen grams (0.02 mole) of 3'-dedimethylamino-$\Delta^{3',4'}$ erythromycin A were dissolved in chloroform. Chloroform is the preferred solvent, but other solvents that are inert to reaction with peracids and 3'-dedimethylamino-$\Delta^{3',4'}$ erythromycin A can also be used. To the resulting solution 20 g. of m-chloro-perbenzoic acid was added slowly over a period of about ½ hour at room temperature. The solution of reactants was then cooled to 0° C. and kept at that temperature for approximately 24 hours. The addition of the peracid at room temperature rather than reduced temperature resulted in better yields, and the subsequent aging at lowered temperature insures completeness of the desired reaction. Of course, the oxidation can be carried out at other temperatures, but this reduces the yield materially.

The cool chloroform solution was extracted with cold aqueous solutions of sodium sulfite, followed by cold aqueous sodium bicarbonate. Because of their non-acidic properties, these aqueous salts do not disrupt the epoxy linkage.

The residue of chloroform was then removed by a slight heating in a water bath under reduced pressure induced by water aspiration.

The remaining crude product was taken up with 25 ml. of warm (28° C.) acetone. Upon cooling to room temperature, the product crystallized spontaneously from the acetone, giving 10.5 grams (74% yield) of 3'-dedimethylamino)-3'-4'-epoxy-erythromycin A having a melting point of 221°–223° C.

Preparation of 3'-dedimethylamino-3'-azido-4'-hydroxyerythromycin A 4.2 grams (0.006 mole) of 3'-dedimethylamino-3'-4'-epoxyerythromycin A was dissolved in 150 ml. dimethylsulfoxide or other suitable solvent such as dimethylformamide or dimethyl acetamide and 6 ml. of water. To the solution was added 1.2 grams (0.066 mole) of magnesium perchlorate and 3.9 grams (0.06 mole) of sodium azide. The solution was heated to 80° C. for 16 hours, and then 300 ml. of water was added. The solution was extracted with chloroform and the chloroform evaporated. This crude product contains a mixture of 3'dedimethylamino-3'-azido-4'-hydroxyerythromycin A and 3'-dedimethylamino-3'-hydroxy-4'-azidoerythromycin A. Since only the former is the desire product, it is separated by extraction with ethyl ether since the 3'-azide is soluble but the 4'-azide is not.

The 3'-azide is dissolved in a ethyl acetate-n-pentane mixture until a slight turbidity is encountered. Upon slight cooling, the purified 3'-azide crystallizes. The product has a melting point of 187°–190° C. and shows the strong infrared band at 2116 cm.$^{-1}$ characteristic of azides.

Preparation of 3'-(dedimethylamino)-3'-amino-4'-hydroxyerythromycin A

3' - dedimethylamino - 3' - azido - 4' - hydroxyerythromycin A (1.0 gram) was dissolved in absolute ethanol and shaken for 2 hours in the presence of hydrogen and PtO$_2$ catalyst on a Parr shaker. The solution was then filtered and evaporated to dryness under the reduced pressure induced by aspiration to yield 1.0 gram of a colorless glass.

The amine was then dissolved in 100 ml. absolute ethanol, and to this solution was added 1.2 ml. of 37% formaldehyde together with 0.85 gram of Pd on carbon black. The resulting mixture was shaken for 24 hours in the presence of hydrogen on a Parr shaker. After hydrogenation, the mixture was filtered, the filtrate collected, and the ethanol and excess formaldehyde removed by distillation under reduced pressure.

The remaining solid residue was dissolved in 300 ml. of cold 0.1 M KH$_2$PO$_4$ and washed twice with methylene chloride. The pH was adjusted to about 9 with 5% Na$_2$CO$_3$, and this now basic solution was twice extracted with methylene chloride. The extracts were combined and dried over anhydrous Na$_2$SO$_4$. Following drying, the extracts were evaporated to dryness at reduced pressure, to yield 0.7 gram of a white amorphous glass. This was recrystallized from methylene chloride-petroleum ether (B.P. 66°–70° C.) to give 0.5 g. (50% yield) of colorless prisms having a melting point of 148°–150° C. This product was characterized as 4'-hydroxyerythromycin A. This was done by reacting the product reduction with NaBH$_4$ followed by reaction with a hydrochloric acidified solution of methanol giving two products. One of these was identified as methyl cladinoside. The other was refluxed with 3 normal HCl for 6 hours and yielded two products identified as mycaminose hydrochloride and 9,9-dihydroerythronolide A, respectively.

Alternative preparation of 4'-hydroxyerythromycin A

One gram of 3'-dedimethylamino-3'-azido-4'-hydroxyerythromycin A was dissolved in 100 ml. absolute ethanol. To this solution, 1.2 ml. of 37% formaldehyde together with 0.85 gram of 5% Pd on carbon black was added. This mixture was shaken for 24 hours in the presence of H$_2$ on a Parr shaker. When the crude product was purified in a similar manner as stated above there was obtained 0.68 g. (68% yield) of 4'-hydroxyerythromycin A having a melting point of 148°–150° C.

The respective derivatives of erythromycin B can be prepared in a manner identical to the preparative examples for the erythromycin A compounds of this invention except that a molar equivalent of erythromycin B is used in place of the erythromycin A.

The 4'-hydroxyerythromycin can be used in dosage amounts, in a regimen similar to erythromycin; and can be administered in any convenient form, that is either the basic compound or an acid-addition salt, by any convenient route.

I claim:

1. A compound of the structure

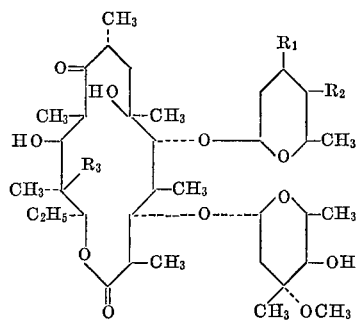

wherein R$_3$ represents hydrogen and hydroxy; when R$_1$ represents a radical selected from the group consisting of amino, azido, and dimethylamino, R$_2$ represents a hydroxy group; when R$_1$ and R$_2$ are taken together, they represent an epoxy group.

2. A physiologically acceptable acid addition salt of a compound according to claim 1 when R$_1$ represents amino and dimethylamino.

3. A compound according to claim 1 in which R$_1$ is dimethylamino and R$_2$ is hydroxy.

4. A physiologically acceptable acid addition salt of a compound according to claim 3.

5. A method of producing 4'-hydroxyerythromycin comprising the steps of reacting 3'-(dedimethylamino)-$\Delta^{3',4'}$-erythromycin with an organic per-acid expoxidizing agent to form 3'-(dedimethyl)-3',4'epoxyerythromycin, opening the epoxide ring with an alkali azide to form 3'-dedimethylamino)-3'-azido-4'-hydroxyerythromycin A, reducing the azido derivative in the presence of formaldehyde to 4'-hydroxyerythromycin.

6. A method according to claim 5 in which the 3'-(dedimethylamino) - 3'-azido-4'-hydroxyerythromycin is first reduced to 3'-(dedimethylamino)-3'-amino-4'-hydroxyerythromycin which is subsequently further reduced in the presence of formaldehyde to 4'-hydroxyerythromycin.

References Cited
UNITED STATES PATENTS 2,862,921  12/1958  Booth et al. _____ 260—210E
3,478,014  11/1969  Djokic et al. _____ 260—210E LEWIS GOTTS, Primary Examiner J. R. BROWN, Assistant Examiner U.S. Cl. X.R.

424—180

UNITED STATES PATENT OFFICE
CERTIFICATE OF CORRECTION

Patent No. 3,598,805     Dated August 10, 1971

Inventor(s)     Peter Hadley Jones

It is certified that error appears in the above-identified patent and that said Letters Patent are hereby corrected as shown below:

Column 1, please insert the following at the end of the Column -- and when $R_1$ and $R_2$ are taken together they represent an epoxy group.--

Column 6, Claim 1, please correct the structure as set forth below

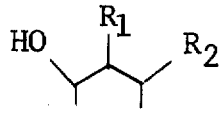

Column 6, Claim 5, line 3, please insert a (-) as set forth below $$\Delta^{-3'},$$

Signed and sealed this 15th day of February 1972.

(SEAL)
Attest:

EDWARD M. FLETCHER, JR.          ROBERT GOTTSCHALK
Attesting Officer                 Commissioner of Patents